United States Patent [19]

Belloso

[11] Patent Number: 4,848,701
[45] Date of Patent: Jul. 18, 1989

[54] VERTICAL TAKE-OFF AND LANDING AIRCRAFT

[76] Inventor: Gregorio M. Belloso, Rte. 1, Box 9323, Cullen Pkwy., Crisfield, Md. 21817

[21] Appl. No.: 64,683

[22] Filed: Jun. 22, 1987

[51] Int. Cl.$^4$ .............................................. B64C 21/08
[52] U.S. Cl. .................................... 244/12.5; 244/207; 244/73 R
[58] Field of Search ............... 244/12.5, 15, 207, 208, 244/215, 217, 73 R, 212

[56] References Cited

U.S. PATENT DOCUMENTS

| | | | |
|---|---|---|---|
| 1,772,196 | 8/1930 | Wallace | 244/12.5 |
| 2,406,918 | 9/1946 | Stalker | 244/208 |
| 2,406,923 | 9/1946 | Stalker | 244/208 |
| 2,466,466 | 4/1949 | Morrisson | 244/207 |
| 2,809,793 | 10/1957 | Warner | 244/208 |
| 2,841,344 | 7/1958 | Stroukoff | 244/208 |
| 3,055,614 | 9/1962 | Thompson | 244/208 |
| 3,161,377 | 12/1964 | Balluff | 244/207 |
| 3,807,663 | 4/1974 | Bartoe, Jr. | 244/207 |
| 3,840,199 | 10/1974 | Tibbs | 244/207 |
| 3,887,146 | 6/1975 | Bright | 244/208 |
| 4,391,424 | 7/1983 | Bartoe, Jr. | 244/207 |

Primary Examiner—Galen Barefoot
Attorney, Agent, or Firm—Norman B. Rainer

[57] ABSTRACT

A fixed wing airplane having a turbofan engine mounted within its fuselage is equipped with communicating air-handling chambers, and pivoted panels positioned in the upper surfaces of the wings and stabilizers. The arrangement of air-handling chambers and pivoted panels supplies high velocity air through discharge slots tangentially to the upper surfaces of the wings and stabilizers, and air inducting slots on the same surfaces downstream from the discharge slots. Such manner of function causes a boundary layer of air to cling tightly to the upper surfaces, and this effect provides reduced pressure that produces vertical lift. Once in forward horizontal flight, the various components of the airplane function in conventional manner.

8 Claims, 2 Drawing Sheets

VERTICAL TAKE-OFF AND LANDING AIRCRAFT

BACKGROUND OF THE INVENTION

This invention relates to fixed wing aircraft, and more particularly concerns aircraft capable of vertical ascent by virtue of lift produced from air blown through slots in the upper surfaces of the wings.

Conventional aircraft generally utilize specifically contoured wings which produce lift during forward horizontal motion through the air. As air flows past the wing, a low pressure is produced on its upper surface, thereby resulting in a lifting effect.

Known heavier-than-air vehicles which can rise in air without forward motion include rocket and jet propelled aircraft wherein downwardly directed gases push the vehicle by reaction effect pursuant to Newton's third law of motion, and helicopters which utilize a large blade structure that rotates in a substantially horizontal plane. Jet propelled airplanes of VTOL design (vertical take-off and landing) are of complex design, utilizing rotating engines which exhaust downwardly for vertical lifting and descent, and exhaust rearwardly for forward motion where lift is produced by fixed wings of generally conventional design.

U.S. Pat. No. 2,946,540 describes an aircraft with enhanced lifting effect achieved by blowing air through slots along the leading edge of the wings. Such lifting improvement is caused by the Coanda Effect wherein the air emergent from the slots forms a layer that clings to the upper wing surface. In practice however, frictional interaction between the ambiant air stream and the upper surface of the wing causes separation of the air stream from the surface of the wing resulting in loss of the Coanda Effect, hence loss of lift.

U.S. Pat. No. 2,939,650 seeks to retain the Coanda Effect by inducting the boundary layer and contiguous layers through perforations in the upper surface of the wing downstream from the slot. A limitation of this approach is that the induction of air may be inadequate to keep up with the rate of formation of the boundary layers at air stream volumes and velocities required for vertical lift.

U.S. Pat. Nos. 1,979,298; 1,993,419; 2,041,795; and 2,223,744 disclose aircraft with air discharge and induction slots in the wings for control of the boundary layer with attendant improved flight performance. However, in said Patents, the volume and velocity of the discharged and inducted air is inadequate for vertical ascent.

It is accordingly an object of the present invention to provide an aircraft having fixed wings equipped with air discharge and induction slots, and associated air handling means capable of producing sufficient velocity and volume of air flow relative to said slots to enable the aircraft to ascend vertically.

It is a further object of this invention to provide an aircraft as in the foregoing object wherein the effectiveness of said slots is controllable.

It is another object of the present invention to provide an aircraft of the aforesaid nature powered by a jet engine.

It is a still further object of this invention to provide an aircraft of the aforesaid nature whose wings provide conventional lift during forward flight.

It is yet another object of the present invention to provide an aircraft of the aforesaid nature whose control surfaces, namely ailerons, flaps and elevators, can effectively control the aircraft during V/STOL and hovering flight as well as during conventional forward flight.

These objects and other objects and advantages of the invention will be apparent from the following description.

SUMMARY OF THE INVENTION

The improvements, objects and advantages of the present invention are accomplished on an aircraft comprising:

(a) an elongated fuselage having forward and rearward extremities and tapering to smaller cross-sectional size in going from said forward to said rearward extremities, (b) wing elements fixed securely to said fuselage adjacent the forward extremity thereof and symmetrically disposed with respect to the axis of elongation of said fuselage, said wing elements having upper and lower surfaces and leading and trailing edges, (c) stabilizer means affixed to said fuselage adjacent the rearward extremity thereof and symmetrically disposed with respect to the axis of said fuselage, said stabilizer means having upper and lower surfaces, (d) a tail fin and rudder assembly affixed to said fuselage adjacent said stabilizer means and extending upwardly in the direction of the upper surfaces of said wings, and (e) a turbofan engine mounted within the fuselage adjacent the forward extremity thereof and adapted to take entering air in through a forward aperture in the fuselage, having a combustion zone for the controlled combustion of a fluid fuel, and adapted to exhaust air and combustion products through an exit nozzle at the rearward extremity of the fuselage and axially aligned therewith.

The improvement of the aforesaid aircraft in accordance with the present invention comprises the provision of:

(a) communicating air-handling chambers disposed within said fuselage, wings and stabilizer means, (b) means for controllably diverting entering air away from the combustion zone of said engine to said air-handling chambers, (c) pivoted panels positioned in the upper surfaces of said wings and stabilizer means, said panels having an arcuate upper surface and leading and trailing edges, said leading edge being adapted to form a discharge slot and said trailing edge being adapted to form an induction slot, and (d) venturi-activated means associated with the air-handling chambers for drawing air through said induction slot, whereby, (e) said panels can be pivotably moved between an open position which forms said slots and places the wing in a vertically ascendable state, and a closed position which places the wing in a state adapted for conventional forward flight.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENTS

Figure 1:
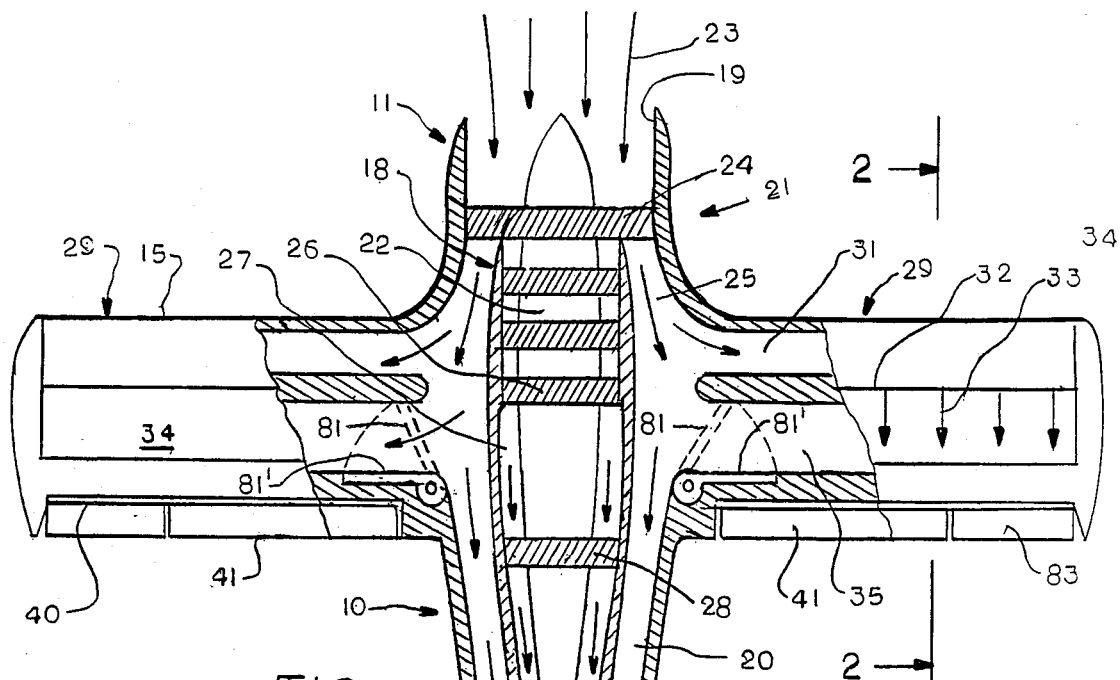
FIG. 1 is a top plan view, partly in section, showing an embodiment of the aircraft of the present invention.

Referring to FIGS. 1-4, an aircraft 21 incorporating an embodiment of the improvements of this invention is shown comprised of elongated fuselage 10 having forward and rearward extremities 11 and 12, respectively, and tapering to smaller cross-sectional size in going from forward to rearward extremities, and wings 29 fixed securely to said fuselage adjacent said forward extremity. The wings are symmetrically disposed with respect to the axis of elongation of the fuselage, and have upper and lower surfaces 34 and 14, respectively, and leading and trailing edges, 15 and 40, respectively. Trailing edge flaps 41 and ailerons 83 are pivotably associated with trailing edges 40.

Stabilizers 46 are affixed to the fuselage adjacent rearward extremity 12, and symmetrically disposed with respect to the axis of the fuselage. The stabilizers have upper and lower surfaces 50 and 13, respectively, and leading and trailing edges 16 and 17, respectively. Elevators 53 are attached by pivot means 58 to trailing edges 17 of the stabilizers.

A high by-pass turbofan engine 18 is mounted within the fuselage adjacent forward extremity 11 having aperture 19 for air entrance. The engine includes a compressor 22 with several stages of axial compressor blades 24, a high pressure compressor stage 26, and a combustion chamber 27 where the entering compressed air is mixed with a fluid fuel and burned. The resulting hot exhaust gases drive turbine 28 which in turn drives compressor 22. The exhaust gases leave the aircraft through exit nozzle 60 to the rear of the fuselage, thereby providing forward thrust to the aircraft.

An air-handling passageway 20 extends through the fuselage and communications with front and rear distribution chambers 31 and 35, respectively, located in the wings, and front and rear distribution chambers 47 and 51, respectively, located in the stabilizers.

About 60 to 90% of the volume of entering air 23 compressed by turbofan blades 24 is diverted from the combustion chamber by passage through by-pass channel 25 of passageway 20. The diverted air is routed to distribution chambers 31, 35, 47 and 51 following the arrowed paths depicted in FIG. 1.

Forward roof panel 66, held by pivot rod 67 disposed along leading edge 15 of each wing, has a convex upper surface 30 contoured to merge with upper surface 34 of the wing, and a concave lower surface 43. The thickness of roof panel 66 tapers to thinner dimensions in going from its forward extremity at pivot rod 67 to its rearward extremity 44.

Rearward roof panel 69, held by pivot rod 68 disposed below rearward extremity 44 of panel 66, has a convex upper surface 45 contoured to merge with upper surface 34 of the wing, and a concave lower surface 84. The thickness of roof panel 69 tapers to thinner dimensions in going from its forward extremity at pivot rod 68 to its rearward extremity 85.

Stabilizers 46 are equipped with forward and rearward roof panels 70 and 72, respectively, held by pivot rods 71 and 73, respectively. The roof panels of the stabilizers are similar in construction, contour and function to the roof panels of the wings.

Figure 2:
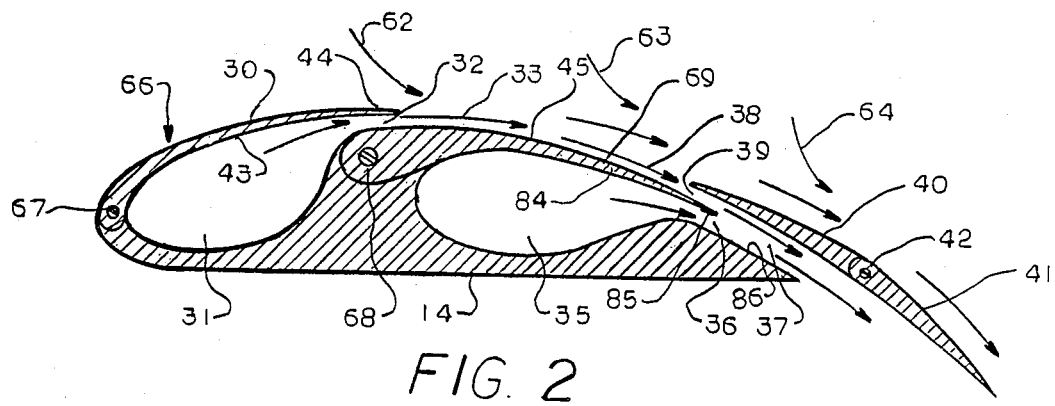
FIG. 2 is an enlarged sectional view taken along the line 2—2 of FIG. 1 and showing the wing in a state adapted for vertical ascent.
Figure 3:
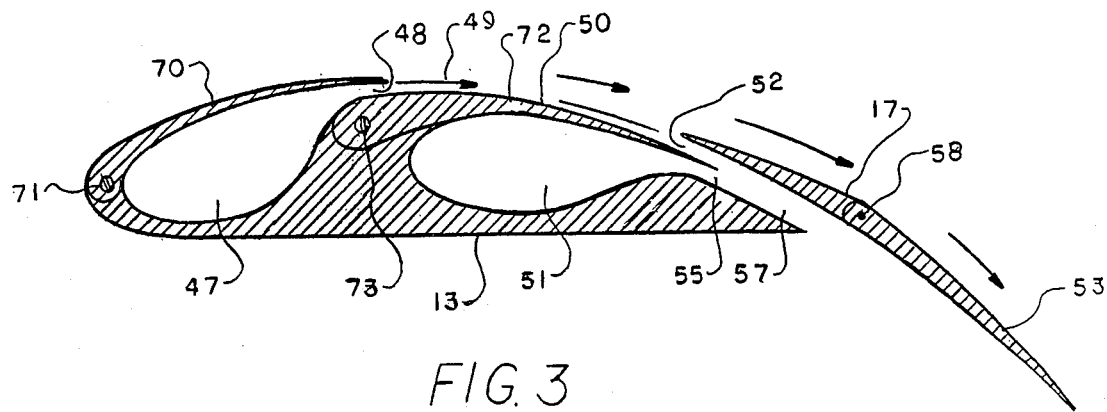
FIG. 3 is a further enlarged sectional view taken along the line 3—3 of FIG. 1.
Figure 4:
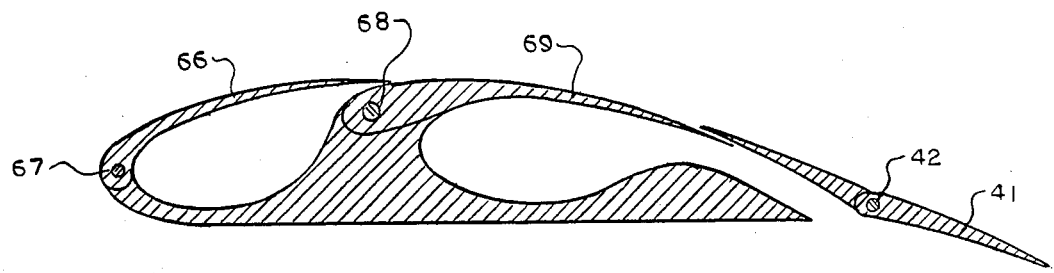
FIG. 4 is the same view as FIG. 2 but showing the wing in a state adapted for conventional forward flight.

In the vertical ascent state shown in FIG. 2, the roof panels of the wings are rotated about their pivot rods such that the rearward extremity 44 of forward panel 66 is in its uppermost position, and the rearward extremity 85 of rearward roof panel 69 is in its lowest position. In the vertical ascent state, the roof panels of the stabilizers are placed in the same configuration as the roof panels of the wings.

In said ascent state, front discharge slots 32 are formed in the wing, defined by the separation of rearward extremity 44 of forward roof panel 66 above the forward extremity of rearward roof panel 69. Slots 32 permit air in front distribution chamber 31 to exit tangentially against convex upper surface 45 of panel 69.

The rearward extremity 85 of rearward roof panel 69, in the ascent state, is positioned between an underlying sub-surface 86 of the wing, and trailing edge 40. Such position defines: (a) a rear discharge slot 36 through which air emerges from distribution chamber 35, (b) induction slot 39 which opens upon the upper wing surface, and (c) venturi channel 37 disposed downwardly and rearwardly with respect to slot 36.

The interactive effects of discharge slot 32 and induction slot 39 is to cause the air stream 33 that exits from discharge slot 32 to follow closely the upper surface 34 of the wing. The boundary layer 38 formed by friction between the air stream 33 and the upper surface 34 of the wing is sucked through induction slot 39 by the suction effect of venturi channel 37 which is energized by the air stream exiting through rear discharge slot 36. Such action ensures stable adhesion of the air stream 33 to the upper surface 34 of the wing.

As the air stream 33 follows the upper surface of the wing it entrains a large volume of surrounding air 62, 63 and 64, which, together with air stream 33 and the air exiting through venturi channel 37 are all accelerated downwardly. The equal and opposite reaction to the downward acceleration of this combined mass of air results in a lifting force acting upon the wing. The lift is augmented when trailing edge flap 41 is held in its down position shown in FIG. 2.

A portion of the diverted air in passageway 20 enters first stabilizer distribution chamber 47 to exit through front stabilizer discharge slots 48. Additional air enters second stabilizer distribution chamber 51 to exit through rear stabilizer discharge slot 55 into venturi channel 57.

As the air stream 49 exits through slots 48 it follows closely the upper surface 50 of the stabilizer, and is sucked through induction slot 52 into venturi channel 57 which is energized by air exiting through rear stabilizer discharge slot 55. The elevators 53 are pivotable at hinge 58 and utilized in the conventional manner.

During vertical and hovering flight, first, second and third pairs of pivoted flapper-type valves 54, 81 and 82 are moved to positions 54', 81', and 82' so that all the air forced by fan blades 24 into by-pass channel 25 is used for supplying compressed air to the distribution chambers in the wings and stabilizers. At the same time, jet exhaust 60 imparts a forward thrust to the aircraft. When sufficient forward speed is attained for the wings to generate sufficient lift for forward flight in the conventional manner, said valves are swung to their opposite positions, causing air from by-pass channel 25 to exit through outer rear nozzle 65 disposed in coaxial relationship with nozzle 60. Such action provides additional forward thrust.

During conventional forward flight, the wings and stabilizers are further streamlined by lowering roof panel 66, thereby closing front discharge slot 32. Roof member 69 is simultaneously raised to close induction slot 39, thus making one continuous streamlined surface of the upper surface of the wing. At the same time, roof panel 70 is lowered to close slot 48, and roof panel 72 is raised to close induction slot 52, thereby streamlining the upper surface of the stabilizer.

Although the principle of the present invention has been exemplified by an aircraft embodiment having a single discharge slot and associated induction slot in each wing and stabilizer, it is to be understood that by employing the structure described hereinabove, multiple slots may be utilized in side-by-side of fore-to-aft sequential relationship.

While particular example of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. In a aircraft comprising:
   (a) an elongated fuselage having forward and rearward extremities and tapering to smaller cross-sectional size in going from said forward to said rearward extremities,
   (b) wing elements fixed securely to said fuselage adjacent the forward extremity thereof and symmetrically disposed with respect to the axis of elongation of said fuselage, said wing elements having upper and lower surfaces and leading and trailing edges,
   (c) stabilizer means affixed to said fuselage adjacent the rearward extremity thereof and symmetrically disposed with respect to the axis of said fuselage, said stabilizer means having upper and lower surfaces, and
   (d) a turbofan engine mounted within the fuselage adjacent the forward extremity thereof and adapted to take entering air in through a forward aperture in the fuselage, said engine having a combustion zone for the controlled combustion of a fluid fuel, and adapted to exhaust air and combustion products through an exit nozzle at the rearward extremity of the fuselage and axially aligned therewith, the improvement comprising:
   (a) communicating air-handling chambers disposed within said fuselage, wings and stabilizer means,
   (b) means for controllably diverting entering air away from the combustion zone of said engine to said air-handling chambers,
   (c) pivoted panels positioned in the upper surfaces of said wings and stabilizer means, said panels having an arcuate upper surface and leading and trailing edges, said leading edge being adapted to form a discharge slot and said trailing edge being adapted to form an induction slot, and
   (d) venturi-activated means associated with the air-handling chambers for drawing air through said induction slot, whereby
   (e) said panels can be pivotably moved between an open position which forms said slots and places the wing in a vertically ascendable state, and a closed position which places the wing in a state adapted for conventional forward flight.

2. The aircraft improvement of claim 1 wherein between about 60 and 90 percent of the entering air is diverted to said air-handling chambers when the wings are in their vertically ascendable state.

3. The aircraft improvement of claim 1 wherein the arcuate upper surfaces of said pivoted panels are contoured to merge with the general contours of the upper surfaces of the respective wings and stabilizer means.

4. The aircraft improvement of claim 1 wherein valves control the flow of air from the air-handling chamber in the fuselage of the air-handling chambers disposed in the wings and stabilizer means.

5. The aircraft improvement of claim 4 wherein the air-handling chamber within said fuseluge terminates in an annular nozzle concentrically disposed about said exit nozzle.

6. In an aircraft comprising:
   (a) an elongated fuselage having forward and rearward extremities and tapering to smaller cross-sectional size in going from said forward to said rearward extremities,
   (b) wing elements fixed securely to said fuselage adjacent the forward extremity thereof and symmetrically disposed with respect to the axis of elongation of said fuselage, said wing elements having upper and lower surfaces and leading and trailing edges,
   (c) stabilizer means affixed to said fuselage adjacent the rearward extremity thereof and symmetrically disposed with respect to the axis of said fuselage, said stabilizer means having upper and lower surfaces and leading and trailing edges, and
   (d) a turbofan engine mounted within the fuselage adjacent the forward extremity thereof and adapted to take entering air in through a forward aperture in the fuselage, said engine having a combustion zone for the controlled combustion of a fluid fuel, and adapted to exhaust air and combustion products through an exit nozzle at the rearward extremity of the fuselage and axially aligned therewith, the improvement comprising:
   (a) communicating air-handling chambers disposed within said fuselage, wings and stabilizer means,
   (b) means for controllably diverting entering air away from the combustion zone of said engine to said air-handling chambers,
   (c) pivoted panels positioned in the upper surfaces of said wings and stabilizer means, said panels having an arcuate upper surface and leading and trailing edges, said training edge being configured to form an induction slot,
   (d) forward panels pivotably associated with the leading edges of said corresponding wings and stabilizer means, and having trailing edges disposed above the leading edges of the respective pivoted panels and controllably spaced therefrom by pivoting motion to form discharge slots, and
   (e) venturi-activated means associated with the air-handling chambers for drawing air through said induction slot, whereby,
   (f) said panels can be pivotably moved between an open position which forms said slots and places the wing in a vertically ascendable state, and a closed position which places the wing in a state adapted for conventional forward flight.

7. The aircraft improvement of claim 6 wherein said forward panel is a roof boundary of an air-handling chamber, and controllably releases air from siad air-handling chamber through said discharge slot.

8. In an aircraft comprising:
(a) an elongated fuselage having forward and rearward extremities and tapering to smaller cross-sectional size in going from said forward to said rearward extremities,
(b) wing elements fixed securely to said fuselage adjacent the forward extremity thereof and symmetrically disposed with respect to the axis of elongation of said fuselage, said wing elements having upper and lower surfaces and leading and trailing edges,
(c) stabilizer means affixed to said fuselage adjacent the rearward extremity thereof and symmetrically disposed with respect to the axis of said fuselage, said stabilizer means having upper and lower surfaces, and
(d) a turbofan engine mounted within the fuselage adjacent the forward extremity thereof and adapted to take entering air in through a forward aperture in the fuselage, said engine having a combustion zone for the controlled combustion of a fluid fuel, and adapted to exhaust air and combustion products through an exit nozzle at the rearward extremity of the fuselage and axially aligned therewith, the improvement comprising:
(a) communicating air-handling chambers disposed within said fuselage, wings and stabilizer means,
(b) means for controllably diverting entering air away from the combustion zone of said engine to said air-handling chambers,
(c) pivoted panels positioned in the upper surfaces of said wings and stabilizer means, said panels having an arcuate upper surface and leading and trailing edges, said leading edge being adapted to form a discharge slot and said trailing edge being adapted to form an induction slot, and
(d) venturi-activated means associated with the air-handling chambers for drawing air through said induction slot, and directing said air below the lower surfaces of said wings and stabilizers, whereby,
(e) said panels can be pivotably moved between an open position which forms said slots and places the wing in a vertically ascendable state, and a closed position which places the wing in a state adapted for conventional forward flight.

* * * * *